United States Patent Office 2,924,023
Patented Feb. 9, 1960

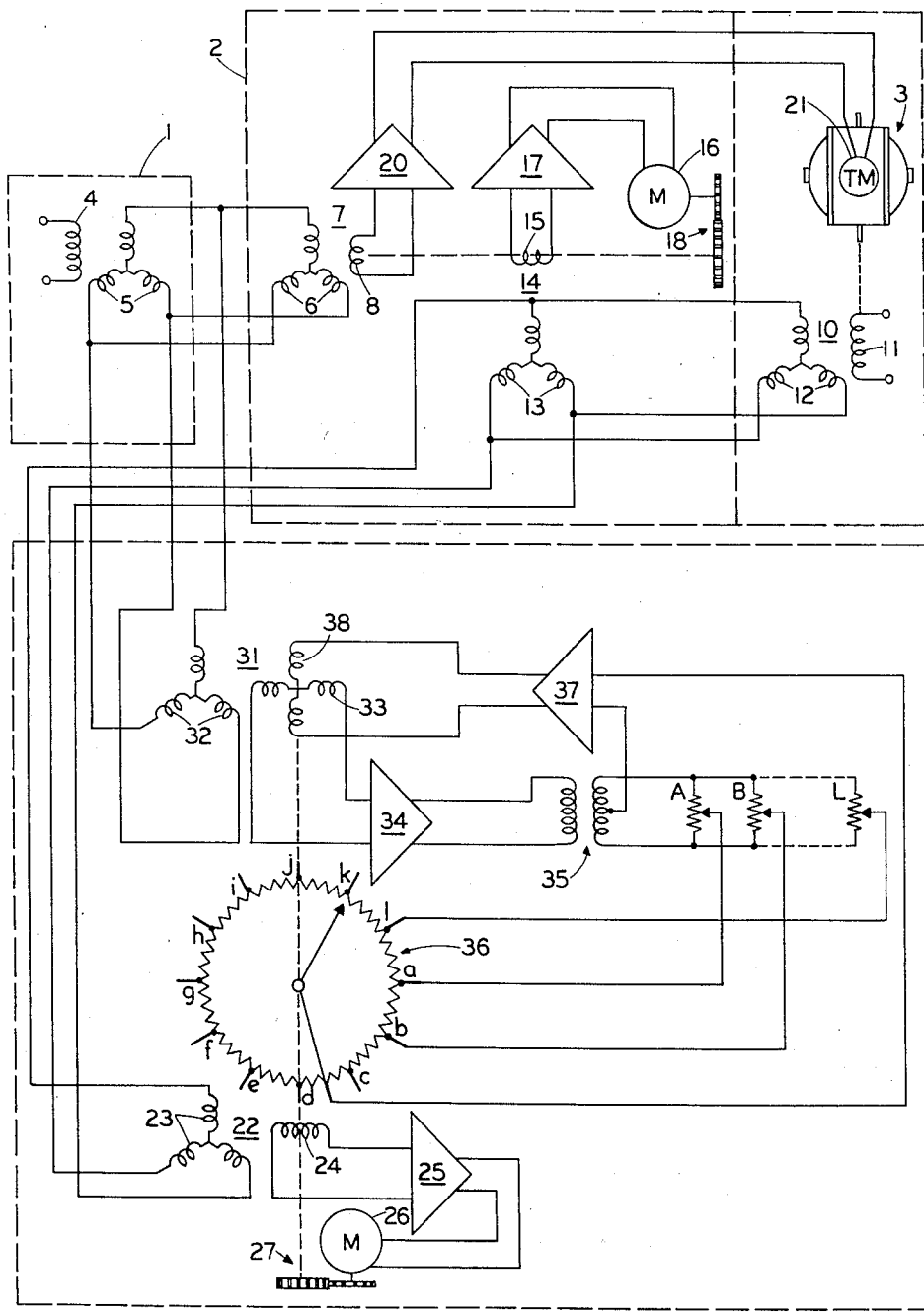

2,924,023

ELECTRICAL ERROR COMPENSATION ARRANGEMENTS FOR DIRECTIONAL SYSTEMS

Harold S. Whitehead, Marblehead, Mass., assignor to General Electric Company, a corporation of New York Application December 31, 1956, Serial No. 631,739

9 Claims. (Cl. 33—224)

This invention pertains to directional systems and more particularly, to an improved error compensation arrangement readily adaptable to existing compass-controlled directional systems.

In directional systems wherein the orientations of a rotatable member are controlled in accordance with a control signal derived from magnetic field sensing means, it is known that compensation for predictable errors in the system may be achieved by the insertion of an appropriate corrective signal such that the combined control and corrective signals will produce substantially the same results which would be obtained from the control signal alone if it were without error. Directional systems incorporating electrical error compensation are disclosed in Patent No. 2,519,058, issued August 15, 1950, for "Deviation Compensator" and in Patent No. 2,570,826, issued October 9, 1951, for "Error Compensator," both of which are assigned to the same assignee as that of the present invention. Not all directional systems are equipped with internal electrical error compensation and it is frequently desired to add such compensation to existing systems.

It is therefore an object of this invention to provide an electrical error compensation arrangement readily connectible to many types of existing directional systems without disassembly or extensive modification of the systems which provides substantially constant angular compensation at each azimuthal heading.

One form of directional system currently employed is a compass-controlled directional gyroscope system in which a control signal from a compass detector synchro governs a torque applying arrangement which applies precessional torques to the gyroscope to maintain it in a predetermined azimuthal orientation. In but one embodiment of the present invention, I propose to add to such a directional system a deviation compensator arrangement which includes a control transformer having stator windings connectable in parallel with the stator windings of the detector synchro in the directional system. The control transformer also includes a pair of rotor windings arranged in space quadrature to one another. A servo mechanism maintains one of the rotor windings in the control transformer in a position relative to the transformer stator windings which is congruent to the position of the rotor winding in the detector synchro. The second rotor winding is therefore automatically positioned within the transformer to derive a reference signal which is proportional in amplitude to the gradient of the control signal from the compass synchro. This reference potential is applied to a suitable electrical compensator arrangement which selectively adjusts the amplitude of the reference signal to provide an error compensating signal which is a function of azimuthal orientation of the directional system. The resulting error compensation signal is then applied to the first control transformer rotor winding and because of the parallel electrical connections referred to above between stator windings, this signal is automatically coupled into the rotor winding of the compass detector synchro. The resulting control signal derived from the compass detector synchro is therefore automatically compensated for errors which it may have possessed if no error compensation were provided.

Although this invention should not be limited, except by a fair interpretation of the appended claims, further details of the invention, as well as additional objects and advantages, will be better understood in connection with the accompanying drawing which represents an improved error compensation arrangement according to this invention electrically connected to a known directional gyro system.

In the accompanying drawing there may be seen an earth-inductor type transmitter 1 which through the control means 2, governs the azimuthal orientation of directional gyroscope 3. In the preferred arrangement shown, an excitation winding 4, usually energized by a 400-cycle potential, periodically saturates a magnetic core structure, not shown, to cause the earth's field to produce a second harmonic pattern of signals in the polyphase-connected windings 5. Because the compass transmitter is normally positioned horizontally, the pattern of signals so produced is related to and characterizes the direction and strength of the horizontal component of the earth's magnetic field. This pattern of signals is repeated across polyphase-connected windings 6 of compass detector synchro 7. Rotor winding 8 within synchro 7 is so arranged with respect to windings 6 that it derives therefrom a phase-and-amplitude characterized control signal whenever it is caused to depart in one direction or the other from a predetermined orientation with respect to the pattern of potentials existing in windings 6. It is to be understood that if the compass transmitter 1 is caused to rotate in azimuth, a condition obtaining when it is carried by a movable craft in a turn, the field produced by the pattern of signals in windings 5 and 6 will shift. But as long as rotor winding 8 moves during turns and retains its position relative to the shifting field, no control signal will be induced therein.

Actually the signal rotor 8 is caused to follow the relative movements of the directional gyroscope 3 by servo means to be described below and the control signal is used to slave the gyroscope to a particular azimuthal orientation in a sort of mutual interdependence. Although the slaving and servo positioning means by which the latter purposes may be accomplished should be familiar to those skilled in the art, their functioning will here be described in order to aid in a proper appreciation of my invention and to clarify certain important relationships between elements of the system.

I prefer to provide the directional gyroscope with a position transmitter unit 10 which includes a rotor winding 11 excited from an alternating current source and arranged to rotate in azimuth with the gyro rotor about its output axis. The transmitter unit also includes stator windings 12 which sense the position of rotor winding 11 and transmit signals characterizing its orientation to the stator windings 13 of a servo detector synchro 14. The latter detector synchro includes a rotor winding 15 which produces a phase-and-amplitude characterized signal whenever its position does not correspond to that of the gyro. This signal serves to control reversible motor 16 through servo amplifier 17 so that through a gearing arrangement 18 the rotor winding 15 is driven back into positional correspondence with the gyro. When the positions of the directional gyro and rotor winding 15 exactly coincide, no signal is picked up by the rotor winding. It is therefore said to be at a null position. Relative movement of the gyro with respect to the craft on which it is mounted, such as would occur during a turn of the craft or during precessional movements of the gyro rotor structure, will cause the rotor 15 to follow the movements of the gyro. Furthermore, because of the mechanical connection shown in dotted lines between this rotor and rotor winding 8, rotor 8 will also repeat the position of the gyroscope. In so doing, rotor winding 8 will derive a phase-and-amplitude characterized control signal in the manner described above whenever the gyroscope departs from a predetermined orientation with respect to the earth's magnetic field. This control signal when applied to amplifier 20 governs torque motor 21 to cause precessional movements of the gyro in the proper direction to return the gyroscope to its predetermined orientation.

As previously indicated, turning of the craft on which this system is mounted will be accompanied by a rotation of the field in detector synchro 7. Turning of the craft will also be accompanied by relative rotation of the gyroscope to maintain its position in azimuth, and the servo system described above serves to maintain rotor winding 8 in a null position within compass synchro detector 7.

As much of the directional system as has been described in the accompanying drawing is known to the art. One embodiment of an error compensation arrangement according to this invention which may be applied to such directional systems is shown in the lower portion of the figure. An additional servo detector synchro 22 has its stator windings 23 electrically connected to receive signals from the above described servo system characterizing the position of the directional gyroscope. As before, a rotor winding 24 produces an amplitude-and-phase characterized signal whenever its position does not correspond to that of the gyro. This signal, when applied to a suitable amplifier 25 controls motor 26 which through a gearing arrangement 27 reorients rotor winding 24 to repeat the position of the directional gyroscope. In being so oriented, certain additional elements mechanically connected thereto as shown by the dotted lines in the lower portion of the figure also follow movements of the gyroscope.

A control transformer 31 is provided with stator windings 32 similar in nature to those possessed by detector synchro 7 above. These stator windings are connected in parallel with the stator windings 6 of detector synchro 7 so that similar potentials exist in each set of windings. Within control transformer 31 a pair of rotor windings 33 and 38 are arranged at an angle to each other, preferably in space quadrature. Rotor winding 38 is driven by the associated servo system such that its position relative to the stator windings of the control transformer is congruent to the position of rotor winding 8 with respect to stator windings 6. Thus, it may be said that rotor winding 38 is at a null position, although it will be seen that its position is used not to derive a signal but to inject a signal into the system. Rotor winding 33 is therefore normally so positioned that it derives a reference signal through control transformer 31 from compass transmitter 1 which is proportional in amplitude to the gradient of the control signal mentioned above in connection with synchro 7.

The advantages of deriving such a signal for use in the error compensation of directional systems are set forth in a copending application by Lewis T. Seaman for "Error Compensated Directional Systems," Serial No. 631,738 filed of even date herewith and assigned to the same assignee as of the present invention. As is more fully set forth in the aforesaid copending application, when carefully preselected amounts of such a reference signal are combined with the control signal at various predetermined azimuthal orientations of the directional system, the resulting error compensation achieved at any given azimuthal point is a constant angular correction independent of the intensity of the earth's magnetic field or of other variable factors which may influence the control signal.

In the utilization of the reference signal derived from winding 33, it is desirable to alter the resulting amplitude, and often the phase, thereof by selected predetermined amounts at each of a plurality of preselected headings of the craft on which the directional system may be mounted. In this manner, an error compensating signal may be produced which will correct for errors which might otherwise result at each azimuthal heading of the craft. Although various electro-mechanical arrangements for this purpose are already described in the patent literature, I have elected to describe my invention in connection with a unique adjustable arrangement for producing an error compensating signal described and claimed in another co-pending application in the name of Emery F. Boose, for "Electrical Error Compensation Arrangements," Serial No. 631,737 filed of even date herewith and assigned to the same assignee as that of the present invention. In applying the reference signal to the adjustable electrical compensator, I prefer to send it through a linear isolation amplifier 34, although this may not be necessary in all cases, and to impress the amplifier output on transformer 35 so that the reference signal appears across the center-tapped secondary of the transformer. The reference signal therefore appears across each of the potentiometers labelled A-L, some of which have been omitted for clarity as indicated by the dotted circuit connections. Each of the fixed multiple contacts on master potentiometer 36 is connected to a movable contact on one of the potentiometers A-L, while the adjustable contact of the master potentiometer applies a resulting error compensation signal to amplifier 37. By virtue of the center-tapped connection on the secondary winding of transformer 35, each of the potentiometers A-L can be adjusted to provide correctly phased predetermined amounts of the reference potential to each of the fixed contacts on the master potentiometer. Because the adjustable contact of the master potentiometer is servo driven to follow the azimuthal movements of the gyroscope, in its movements from point to point about the potentiometer, it will derive an error-compensating signal which is a function of heading. The shape of the error-compensating curve may easily be varied to suit the needs of any given installation by appropriate adjustment of the potentiometers A-L. As is more fully set forth in the aforesaid co-pending application of Emery F. Boose, the resulting error correction curve has the advantage of providing a smooth straight-line slope between compensation points, making it possible to correct for virtually any combination of errors, whether electrical or mechanical in derivation. Naturally, the greater the number of fixed contacts on the master potentiometers which are provided with adjustable potentials, the smoother will be the resulting error compensation curve.

The error compensation signal appearing in the output of amplifier 37 is applied to winding 38 of the control transformer. Because of the congruency of the position of rotor winding 38 to that of rotor winding 8, the error compensation signal is automatically inductively coupled through the stator windings of control transformer 31 and of detector synchro 7 into rotor winding 8. As a result, a combined control-and-error compensation signal governs the action of amplifier 20 to control the azimuthal orientation of the directional gyroscope.

It will be seen that in applying this unique error compensation arrangement to an existing directional system, it is not necessary to disturb any of the relationships between elements of the directional system. On the contrary, it is required only to bring out electrical connections from certain points in the system. Furthermore, because the compass transmitter and the directional gyro are generally remotely positioned, the electrical connections required may be made at standard terminal points in the system. In the best mode contemplated of carrying out my invention, it is possible furthermore to incorporate the unique advantages inherent in both the inventions disclosed and claimed in the aforesaid copending patent applications.

While I have preferred to describe my invention as connectable in a particular gyro compass system, it will be apparent that the invention is not limited to the exact system identified and that numerous substitutions and variations may be made both in the directional system and in the error compensation arrangement within the scope of these teachings. Therefore, certain variations within the scope of the following claims will doubtless occur to those skilled in the art to which this invention pertains.

What I claim as new and desire to secure by Letters Patent of the United States is:

1. An error compensator arrangement for a directional system on a movable craft in which a first rotor winding servo-driven to a null position in a compass synchro detector supplies a control signal slaving a directional gyroscope to a predetermined azimuthal orientation comprising: a control transformer having stator windings electrically connected to receive the same potentials received by the aforesaid detector and a pair of rotor windings arranged at angles to each other; servo drive means connected to receive control signals from the servo system driving said first rotor winding and arranged to drive the first of said pair of rotor windings to a null position in said transformer congruent with the position of said first rotor winding in said detector, thereby positioning the second of said pair of rotor windings to receive a reference signal varying in amplitude with the gradient of said control signal; means adjustably altering the amplitude of said reference signal by a fixed preselected ratio at each of a plurality of preselected headings of said craft to produce an error-compensating signal which is a function of azimuthal heading; and means introducing said error-compensating signal into the first of said pair of rotor windings, whereby an error-compensating signal is coupled into said first rotor winding through said synchro detector.

2. An error compensating arrangement for a directional system on a movable craft in which stator windings of a detector unit receive electrical signals from a compass transmitter varying with the direction of the horizontal component of the earth's magnetic field and in which a rotor winding of said detector unit is driven to a null position in said detector unit to supply a phase-and-amplitude characterized control signal slaving a directional gyroscope to a predetermined azimuthal orientation comprising: a control transformer having stator windings connected in parallel with said detector stator windings and a pair of rotor windings arranged in space quadrature; means driving the first of said pair of rotor windings to a null position within said control transformer congruent with the position of said rotor winding in said detector, thereby positioning the second of said pair of rotor windings to receive a reference signal varying in amplitude with the gradient of said control signal; means adjustably altering the amplitude of said reference signal by a fixed preselected ratio at each of a plurality of preselected headings of said craft to produce an error-compensating signal which is a function of azimuthal heading; and means introducing said error-compensating signal into the first of said pair of rotor windings, whereby an error-compensating signal is coupled into said first rotor winding through said synchro detector.

3. An error compensator arrangement adapted to introduce an error-compensating signal into a directional system on a movable craft having a direction gyroscope, a compass transmitter producing a plurality of electrical signals characterizing the direction of the earth's magnetic field, a synchro detector receiving said signals and including a first rotor winding for deriving a control signal, slaving means actuated by said control signal for controlling precessional movements of said gyroscope, and a first servo system positioning said first rotor winding to a position corresponding to the azimuthal orientation of said gyroscope, which comprises: a control transformer connected to receive the electrical signals from said compass transmitter and having a pair of rotor windings arranged at an angle to each other; a second servo system connected to said first servo system to receive signals therefrom for positioning the first of said pair of rotor windings to a null position with respect to said control transformer congruent with the position of said first rotor winding with respect to said detector, thereby positioning the second of said pair of rotor windings to receive a reference signal varying in amplitude with the gradient of said control signal; means adjustably altering the amplitude of said reference signal by a fixed preselected ratio at each of a plurality of preselected headings of said craft to produce an error-compensating signal which is a function of azimuthal heading; and means introducing said error-compensating signal into the first of said pair of rotor windings, whereby an error-compensating signal is coupled into said first rotor winding through said synchro detector.

4. An error compensator arrangement adapted to introduce an error-compensating signal into a directional system on a movable craft having a directional gyroscope, a compass transmitter producing a plurality of electrical signals varying with the direction of the earth's magnetic field, a synchro detector receiving said signals and including a first rotor winding for deriving a control signal, slaving means actuated by said control signal for controlling precessional movements of said gyroscope, and means rotatably positioning said rotor winding within said detector to correspond with the azimuthal orientation of said gyroscope, which comprises: a control transformer connected in parallel with said detector to receive said electrical signals from said compass transmitter and having a pair of rotor windings arranged at an angle to each other; means positioning the first of said pair of rotor windings to a null position within said transformer congruent with the position of said first rotor winding within said detector, thereby positioning the second of said pair of rotor windings to receive a reference signal varying in amplitude with the gradient of said control signal; means adjustably altering the amplitude of said reference signal by a fixed preselected ratio at each of a plurality of preselected headings of said craft to produce an error-compensating signal which is a function of azimuthal heading; and means introducing said error-compensating signal into the first of said pair of rotor windings, whereby an error-compensating signal is coupled into said first rotor winding through said synchro detector.

5. An error compensator arrangement for a directional system on a movable craft in which the first of two relatively rotatable windings in a synchro detector receives signals from a compass transmitter varying with the direction of the horizontal component of the earth's magnetic field and in which the second of said relatively rotatable windings derives a phase-and-amplitude characterized control signal by virtue of its position relative to said first winding comprising: a control transformer having two relatively rotatable windings, the first of said transformer windings being electrically connected in parallel with the first of said detector windings to receive said compass transmitter signals, and a third winding arranged at a fixed angle with respect to the second of said relatively rotatable transformer windings; means positioning said relatively rotatable transformer windings such that the physical relationship between said relatively rotatable transformer windings is congruent to the physical relationship between said relatively rotatable detector windings, and such that said third transformer winding derives a reference signal varying in amplitude with the gradient of said control signal; means adjustably altering the amplitude of said reference signal by a fixed preselected ratio at each of a plurality of predetermined headings of said craft to produce an error-compensating signal which is a function of azimuthal heading; and means introducing said error-compensating signal into the second of said relatively rotatable transformer windings, whereby an error-compensating signal is coupled into the control signal winding of said synchro detector.

6. An error compensator arrangement for a directional system on a movable craft in which the stator windings in a detector receive signals from a compass transmitter varying with the direction of the horizontal component of the earth's magnetic field and in which the rotor windings in said synchro detector derive a phase-and-amplitude characterized control signal by virtue of their position relative to said stator windings comprising: a control transformer having stator windings electrically connected in parallel with said detector stator windings to receive said compass transmitter signals and a pair of rotor windings angularly arranged relative to each other; means positioning said rotor windings in said control transformer such that the physical relationship between the first of said pair of rotor windings and the stator windings in said control transformer is congruent to the physical relationship between the rotor and stator windings in said detector, and such that the second of said pair of rotor windings derives a reference signal varying in amplitude with the gradient of said control signal; means adjustably altering the amplitude of said reference signal by a fixed preselected ratio at each of a plurality of predetermined headings of said craft to produce an error-compensating signal which is a function of azimuthal heading; and means introducing said error-compensating signal into the first of said pair of rotor windings, whereby an error-compensating signal is coupled into the rotor windings of said synchro detector.

7. An error compensator arrangement for a directional system on a movable craft in which the rotor windings in a synchro detector having stator windings receiving signals from a compass transmitter varying with the direction of the horizontal component of the earth's magnetic field derive a control signal by virtue of their position relative to said stator windings comprising: a control transformer having stator windings electrically connected to receive said compass transmitter signals and a pair of rotor windings angularly arranged with respect to each other and movable relative to said stator windings; means positioning said pair of rotor windings in said control transformer such that the physical relationship between the first of said pair of rotor windings and the stator windings of said control transformer is congruent to the physical relationship between the rotor and stator windings of said detector, and such that the second of said pair of windings derives a reference signal varying in amplitude with the gradient of said control signal; means adjustably altering the amplitude of said reference signal by a fixed preselected ratio at each of a plurality of predetermined headings of said craft to produce an error-compensating signal which is a function of azimuthal heading; and means introducing said error-compensating signal into the first of said pair of rotor windings, whereby an error-compensating signal is coupled into the rotor windings of said synchro detector.

8. An error compensated directional system for movable craft comprising: a compass transmitter producing a plurality of electrical signals characterizing the direction of the earth's magnetic field; a detector having stator windings connected to receive said signals and a control signal rotor winding deriving a control signal by virtue of its position relative to said stator windings; a control transformer having stator windings connected in parallel with the stator windings of said detector and a pair of rotor windings arranged at an angle to each other; means positioning the first of said pair of rotor windings to a position within said control transformer congruent with the position of the rotor winding in said first detector, and positioning the second of said pair of rotor windings to receive a reference signal varying in amplitude with the gradient of said control signal; means adjustably altering the amplitude of said reference signal by a fixed, preselected ratio at each of a plurality of preselected headings of said craft to produce an error-compensating signal which is a function of azimuthal heading; means introducing said error-compensating signal into the first of said pair of rotor windings, whereby an error-compensating signal is coupled into said control signal rotor winding through said detector; a rotatable direction indicating member; and means governing the orientation of said direction indicating member in accordance with said control signal as modified by said error-compensating signal.

9. An error compensated directional system for movable craft comprising: a compass transmitter producing a signal output varying with the direction of the horizontal component of the earth's magnetic field; a directional gyroscope; means for precessing said gyroscope in azimuth; means controlling said precessing means to maintain said gyroscope at a predetermined azimuthal orientation including a compass detector having two relatively rotatable cooperative windings, the first of said detector windings connected to receive said signal output, the second of said detector windings supplying a phase-and-amplitude characterized control signal to said precessing means by virtue of the angular orientations between said relatively rotatable windings, a control transformer having two relatively rotatable cooperative windings, the first of said transformer windings connected in parallel with the first of said detector windings to receive said signal output, means occasioning concomitant and congruent angular displacements between said relatively rotatable windings of said compass detector and said control transformer with azimuthal rotation of said gyroscope, a third winding in said transformer arranged at a fixed angle with respect to the second of said transformer windings to derive a reference signal varying in amplitude with the gradient of said control signal, means adjustably altering the amplitude of said reference signal by a fixed preselected ratio at each of a plurality of preselected headings of said craft to produce an error-compensating signal which is a function of azimuthal heading, and means introducing said error-compensating signal into the second of said transformer windings, thereby coupling an error-compensating signal into the second of said detector windings.

References Cited in the file of this patent

UNITED STATES PATENTS 2,570,826 Lundberg et al.     Oct. 9, 1951